(12) United States Patent
Xu et al.

(10) Patent No.: US 12,705,701 B2
(45) Date of Patent: Aug. 11, 2026

(54) IMAGE PROCESSING METHOD, APPARATUS, AND DEVICE, AND STORAGE MEDIUM

(71) Applicant: Beijing Zitiao Network Technology Co., Ltd., Beijing (CN)

(72) Inventors: Panpan Xu, Beijing (CN); Miao Hua, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 134 days.

(21) Appl. No.: 18/717,682

(22) PCT Filed: Dec. 2, 2022

(86) PCT No.: PCT/CN2022/136137

§ 371 (c)(1), (2) Date: Jun. 7, 2024

(87) PCT Pub. No.: WO2023/103897

PCT Pub. Date: Jun. 15, 2023

(65) Prior Publication Data

US 2025/0054105 A1 Feb. 13, 2025

(30) Foreign Application Priority Data

Dec. 10, 2021 (CN) ........................ 202111509720.7

(51) Int. Cl.

*G06T 5/50* (2006.01)
*G06V 10/80* (2022.01)
*G06V 40/16* (2022.01)

(52) U.S. Cl.

CPC .............. *G06T 5/50* (2013.01); *G06V 10/806* (2022.01); *G06V 40/168* (2022.01); *G06T 2207/20221* (2013.01)

(58) Field of Classification Search

None

See application file for complete search history.

(56) References Cited

U.S. PATENT DOCUMENTS

| | | | | |
|---|---|---|---|---|
| 8,730,231 | B2 * | 5/2014 | Snoddy | G06T 13/40<br>345/651 |
| 2018/0204052 | A1 * | 7/2018 | Li | G06T 3/18 |
| 2021/0142440 | A1 | 5/2021 | Ahn et al. | |

FOREIGN PATENT DOCUMENTS

| | | |
|---|---|---|
| CN | 109919888 A | 6/2019 |
| CN | 111401216 A | 7/2020 |

(Continued)

OTHER PUBLICATIONS

International Patent Application No. PCT/CN2022/136137; Int'l Search Report; dated Feb. 10, 2023; 2 pages.

*Primary Examiner* — Robert J Craddock

(74) *Attorney, Agent, or Firm* — BakerHostetler

(57) ABSTRACT

Disclosed in examples of the disclosure are a method, apparatus, device, and storage medium for processing image. The method includes: extracting facial feature information of a first character appearance image and structural feature information of a second character appearance image (S110); inputting the facial feature information and the structural feature information into a first character appearance fusion model, and obtaining a third character appearance image (S120); training a second character appearance fusion model based on the first character appearance image, the second character appearance image and the third character appearance image (S130); and inputting a source character appearance image and a target character appearance image into the trained second character appearance fusion model to obtain a new character appearance image (S140).

20 Claims, 3 Drawing Sheets

(56) References Cited

FOREIGN PATENT DOCUMENTS

| | | | |
|---|---|---|---|
| CN | 111783647 | A | 10/2020 |
| CN | 112288664 | A | 1/2021 |
| CN | 112991494 | A | 6/2021 |
| CN | 113642491 | A | 11/2021 |
| CN | 113763232 | A | 12/2021 |
| CN | 114170342 | A | 3/2022 |

* cited by examiner

IMAGE PROCESSING METHOD, APPARATUS, AND DEVICE, AND STORAGE MEDIUM

CROSS-REFERENCE TO RELATED APPLICATION(S)

The disclosure is a national stage application filed under 35 U.S.C. 371 based on International Patent Application No. PCT/CN2022/136137, filed Dec. 2, 2022, which claims the right of priority to Chinese patent application No. 202111509720.7, filed on Dec. 10, 2021, which are incorporated herein by reference in their entireties.

FIELD

Examples of the disclosure relate to the technical field of image processing, and relate to, for example, methods and apparatuses, devices, and storage medium for processing image.

BACKGROUND

Character appearance fusion is intended to superpose a source character appearance onto a target character appearance, with facial information represented by the source character appearance and detailed information such as posture and facial expression of the target character appearance reserved. But the character appearance fusion technology in the related technology has low image accuracy.

SUMMARY

Examples of the disclosure provide methods and apparatuses, device, and storage medium for processing image, which can improve efficiency of character appearance fusion and accuracy of a generated character appearance replacement.

In a first aspect, the examples of the disclosure provide a method for processing an image, including:

- extracting facial feature information of a first character appearance image and structural feature information of a second character appearance image;
- inputting the facial feature information and the structural feature information into a first character appearance fusion model to obtain a third character appearance image;
- training a second character appearance fusion model based on the first character appearance image, the second character appearance image and the third character appearance image; and
- inputting a source character appearance image and a target character appearance image into the trained second character appearance fusion model to obtain a new character appearance image.

In a second aspect, the examples of the disclosure further provide an apparatus for processing an image, including:

- a feature information extraction module configured to extract facial feature information of a first character appearance image and structural feature information of a second character appearance image;
- a third character appearance image obtaining module configured to input the facial feature information and the structural feature information into a first character appearance fusion model to obtain a third character appearance image;
- a second character appearance fusion model training module configured to train a second character appearance fusion model based on the first character appearance image, the second character appearance image and the third character appearance image; and
- a new character appearance image obtaining module configured to input a source character appearance image and a target character appearance image into the trained second character appearance fusion model to obtain a new character appearance image.

In a third aspect, the examples of the disclosure further provide an electronic device. The electronic device includes:

- at least one processor; and
- a memory configured to store at least one program; where
- when executed by the at least one processor, the at least one program causes the at least one processor to implement the method for processing an image according to the examples of the disclosure.

In a fourth aspect, the examples of the disclosure provide a computer-readable medium, storing a computer program. The program implements the method for processing an image according to the examples of the disclosure when executed by a processor.

In a fifth aspect, the examples of the disclosure provide a computer program product. When executed by a computer, the computer program product causes the computer to implement the method for processing an image according to the examples of the disclosure.

DETAILED DESCRIPTION OF EMBODIMENTS

Figures 1, 2:
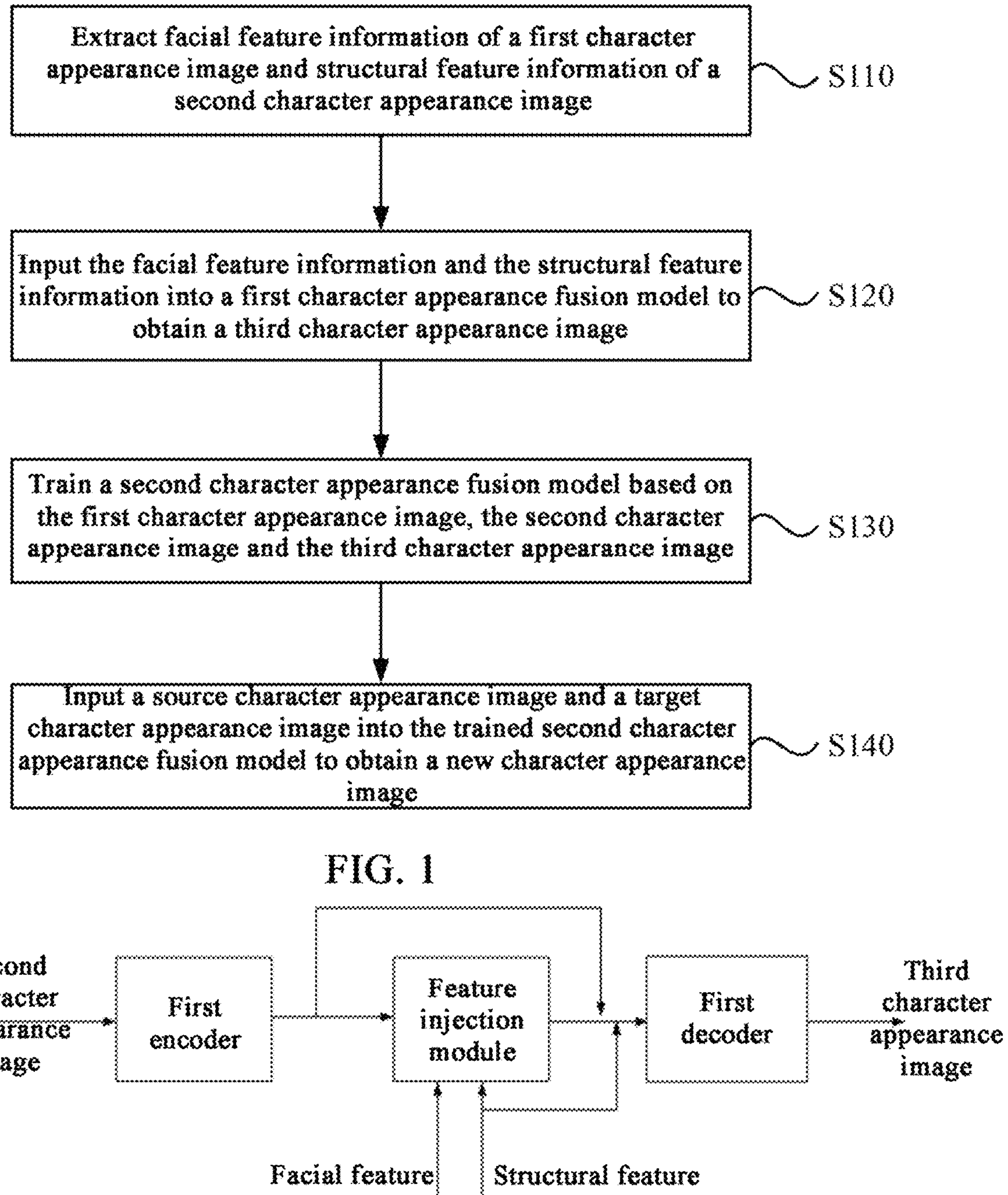
FIG. 1 is a flowchart of a method for processing an image according to an example of the disclosure.
FIG. 2 is a schematic structural diagram of a first character appearance fusion model according to an example of the disclosure.

Examples of the disclosure are described in more detail below with reference to the drawings. Although some examples of the disclosure are shown in the drawings, it should be understood that the disclosure may be embodied in various forms and should not be construed as being limited to the examples set forth herein. On the contrary, these examples are provided, such that the disclosure will be understood more thoroughly and completely. It should be understood that the drawings and examples of the disclosure are for illustrative purposes merely and are not intended to limit the scope of protection of the disclosure.

It should be understood that various steps recited in the method embodiments of the disclosure can be performed in different orders and/or in parallel. Furthermore, the method embodiments can include additional steps and/or omit to execute the illustrated steps. The scope of the disclosure is not limited in this respect.

As used herein, the term “comprise” or “include” and their variations are open-ended, that is, “comprise but not limited to” and “include but not limited to”. The term “based on” is “based at least in part on”. The term “an example”

means "at least one example". The term "another example" means "at least one further example". The term "some examples" means "at least some examples". Definitions for other terms are given in the description below.

It should be noted that concepts such as "first" and "second" mentioned in the disclosure are merely used to distinguish different apparatuses, modules or units, and are not used to limit the order of functions executed by these apparatuses, modules or units or their interdependence.

It should be noted that the modification with "a", "an" or "a plurality of" in the disclosure is intended to be illustrative rather than limitative, and should be understood by those skilled in the art as "at least one" unless the context clearly dictates otherwise.

The names of messages or information exchanged between a plurality of apparatuses in the embodiments of the disclosure are merely for illustrative purposes, and are not intended to limit the scope of these messages or information.

FIG. 1 is a flowchart of a method for processing an image provided in an example of the disclosure. The example may be applicable to a case of fusing two character appearance images. The method may be executed by an apparatus for processing an image. The apparatus may be composed of hardware and/or software, and may generally be integrated into a device having a character appearance fusion function. The device may be an electronic device such as a server, a mobile terminal, or a server cluster. As shown in FIG. 1, the method includes:

Step 110, extracting facial feature information of a first character appearance image and structural feature information of a second character appearance image.

Facial feature (identity document, ID) information of a character appearance image may be characterized by a vector with a size of 1*512, and may be obtained by using a character appearance facial feature extraction model in the related art, which is not limited in the examples. The structural feature information of the character appearance image may include texture information, expression information, structural information, pose information of a character appearance etc., and may be extracted using a visual geometry group network (VGG) model. In the example, the structural feature information may be multi-scale feature information.

Step 120, inputting the facial feature information and the structural feature information into a first character appearance fusion model to obtain a third character appearance image.

The third character appearance image incorporates the facial feature information of the first character appearance image and the structural feature information of the second character appearance image. The first character appearance fusion model fuses the facial feature information and the structural feature information to obtain a third character appearance image.

Additionally, the first character appearance fusion model includes a feature injection module and a first decoder. The step of inputting the facial feature information and the structural feature information into a first character appearance fusion model, and obtaining a third character appearance image may include: input the facial feature information and the structural feature information into the feature injection module, and obtain fused feature information; and input the fused feature information into the first decoder, and output the third character appearance image.

The feature injection module is configured to fuse the facial feature information and the structural feature information. The first decoder is configured to decode the fused feature information, so as to obtain the third character appearance image. In the example, the feature injection module is configured to fuse the facial feature information and the structural feature information, such that accuracy of feature fusion can be improved.

Additionally, the first character appearance fusion model further includes a first encoder. The first encoder is hop-connected with the first decoder. FIG. 2 is a schematic structural diagram of the first character appearance fusion model according to the example. As shown in FIG. 2, the step of inputting the facial feature information and the structural feature information into a first character appearance fusion model to obtain a third character appearance image may include: input the second character appearance image into the first encoder to obtain first encoding information; input the first encoding information, the facial feature information, and the structural feature information into the feature injection module to obtain fused feature information; and input the fused feature information, the first encoding information, and the structural feature information into the first decoder to obtain the third character appearance image.

As shown in FIG. 2, the second character appearance image is input into the feature injection module through the first encoder, such that accuracy of the generated third character appearance image may be improved. The second character appearance image is hopped input into the first decoder by the first encoder, such that loss of features of the second character appearance image may be prevented. The structural feature information is input into the feature injection module and then input into the first decoder, such that loss of the structural feature information may be prevented.

Additionally, in the example, the structural feature information of the first character appearance image may be extracted, and the structural feature information of the first character appearance image may also be input into the feature injection module and the first decoder. That is to say, the step of inputting the facial feature information and the structural feature information into a first character appearance fusion model to obtain a third character appearance image may further include: input the second character appearance image into the first encoder to obtain first encoding information; input the first encoding information, the facial feature information of the first character appearance image, the structural feature information of the first character appearance image and the structural feature information of the second character appearance image into the feature injection module to obtain fused feature information; and input the fused feature information, the first encoding information, the structural feature information of the first character appearance image and the structural feature information of the second character appearance image into the first decoder to obtain the third character appearance image. In this way, the accuracy of the generated third character appearance image can be guaranteed.

Additionally, the feature injection module includes a fully-connected layer, a convolutional layer and an injection layer. The step of inputting the first encoding information, the facial feature information, and the structural feature information into the feature injection module, and obtaining fused feature information may include: input the facial feature information into the fully-connected layer to obtain intermediate facial feature information; input the structural feature information into the convolutional layer, and obtain intermediate structural feature information; and input the intermediate facial feature information, the intermediate structural feature information, and the first encoding information into the injection layer for fusion to output the fused feature information.

Figure 3:
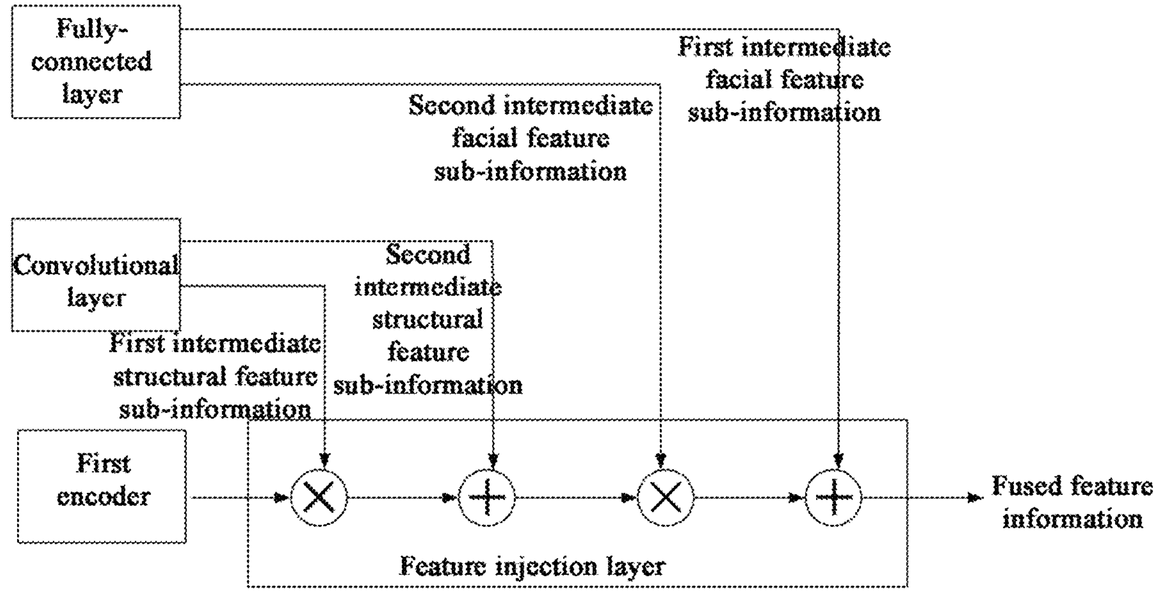
FIG. 3 is a schematic diagram of feature fusion in an example of the disclosure.

The intermediate facial feature information includes first intermediate facial feature sub-information and second intermediate facial feature sub-information. The intermediate structural feature information includes first intermediate structural feature sub-information and second intermediate structural feature sub-information. FIG. 3 is a schematic diagram of feature fusion in an example. As shown in FIG. 3, the step of inputting the intermediate facial feature information, the intermediate structural feature information, and the first encoding information into the injection layer for fusion may include: first, multiply the first intermediate structural feature sub-information by the first encoding information, add the second intermediate structural feature sub-information, obtain the intermediate fusion information, then multiply the intermediate fusion information by the first intermediate facial feature sub-information, add the second intermediate facial feature sub-information, and obtain the fused feature information. In the example, the facial feature information and the structural feature information are fused by the injection layer, such that the accuracy of feature information fusion may be improved.

Additionally, a method for training the first character appearance fusion model may include: extract first facial feature sample information of a first character appearance sample and first structural feature sample information of a second character appearance sample; input the first facial feature sample information and the first structural feature sample information into the first character appearance fusion model to output a third character appearance sample;

extract second facial feature sample information and second structural feature sample information of the third character appearance sample; determine a first loss function of the second facial feature sample information and the first facial feature sample information, and a second loss function of the second structural feature sample information and the first structural feature sample information; and train the first character appearance fusion model based on the first loss function and the second loss function.

The first character appearance sample and the second character appearance sample may be obtained by collecting character appearances from different angles, different ages and different lights, or obtained from a local database or a network database, or may be virtual character appearance images rendered by a rendering tool. Facial feature information may be represented by a vector with a size of 1*512, and may be obtained by using a character appearance facial feature extraction model in the related art, which is not limited in the examples. The structural feature information may include texture information, expression information, structural information, pose information of a character appearance etc., and may be extracted using a visual geometry group network (VGG) model. In the example, the structural feature information may be multi-scale feature information.

A method for extracting the second facial feature sample information of the third character appearance sample is the same as the method for extracting the first facial feature sample information of the first character appearance sample. A method for extracting the second structural feature sample information of the third character appearance sample is the same as the method for extracting the first structural feature sample information of the second character appearance sample. Illustratively, the step of training the first character appearance fusion model based on the first loss function and the second loss function may include: adjust parameters in the first character appearance fusion model based on back propagation of the first loss function and the second loss function until the first character appearance fusion model satisfies a training termination condition. In the example, by training the first character appearance fusion model, the first character appearance fusion model may accurately fuse the facial feature information and the structural feature information, so as to guarantee the accuracy of the generated third character appearance image.

Step 130, training a second character appearance fusion model based on the first character appearance image, the second character appearance image and the third character appearance image.

The second character appearance fusion model has a function of fusing the first character appearance image and the second character appearance image. The second character appearance fusion model includes a second encoder and a second decoder.

Illustratively, the step of training a second character appearance fusion model based on the first character appearance image, the second character appearance image, and the third character appearance image may include: input the first character appearance image and the second character appearance image into the second character appearance fusion model to obtain a fused character appearance image; determine a third loss function of the fused character appearance image and the third character appearance image; and train the second character appearance fusion model based on the third loss function.

The step of training the second character appearance fusion model based on the third loss function may include: adjust parameters in the second character appearance fusion model by back-propagating the third loss function in the model until the second character appearance fusion model satisfies a training termination condition. In the example, the second character appearance fusion model is trained based on the trained first character appearance fusion model, such that the first character appearance fusion model may implement the function of character appearance fusion by using a simple network structure. Not only an operation speed of the second fusion model is improved, but also deployment of the second character appearance fusion model in a mobile terminal is facilitated.

Step 140, inputting a source character appearance image and a target character appearance image into the trained second character appearance fusion model, and obtain a new character appearance image.

The second character appearance fusion model includes a second encoder and a second decoder. The step of inputting a source character appearance image and a target character appearance image into the trained second character appearance fusion model, and obtaining a new character appearance image may include: input the source character appearance image and the target character appearance image into the second encoder to obtain second encoding information; and input the second encoding information into the second decoder to obtain the new character appearance image.

In the example, the second character appearance fusion model includes the second encoder and the second decoder, has a simple structure and a small calculation amount, and may quickly fuse the source character appearance image and the target character appearance image to form a new character appearance image, so as to improve the efficiency of character appearance fusion.

According to the technical solution of the examples, the method includes: extracting facial feature information of a first character appearance image and structural feature information of a second character appearance image; inputting the facial feature information and the structural feature information into a first character appearance fusion model to obtain a third character appearance image; training a second character appearance fusion model based on the first character appearance image, the second character appearance image and the third character appearance image; and inputting a source character appearance image and a target character appearance image into the trained second character appearance fusion model to obtain a new character appearance image. According to the method for processing image provided in the examples of the disclosure, the second character appearance fusion model is trained based on the first character appearance image, the second character appearance image and the third character appearance image output by the first character appearance fusion model, such that the efficiency of character appearance fusion and accuracy of a generated character appearance replacement may be improved.

Figure 4:
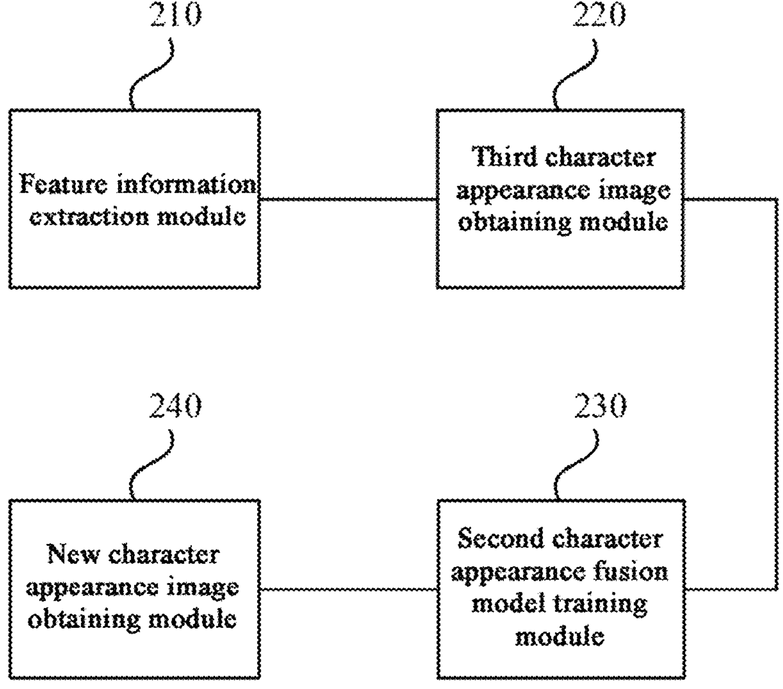
FIG. 4 is a schematic structural diagram of an apparatus for processing an image according to an example of the disclosure.

FIG. 4 is a schematic structural diagram of an apparatus for processing an image according to an example of the disclosure. As shown in FIG. 4, the apparatus includes:

- a feature information extraction module 210 configured to extract facial feature information of a first character appearance image and structural feature information of a second character appearance image;
- a third character appearance image obtaining module 220 configured to input the facial feature information and the structural feature information into a first character appearance fusion model to obtain a third character appearance image;
- a second character appearance fusion model training module 230 configured to train a second character appearance fusion model based on the first character appearance image, the second character appearance image and the third character appearance image; and
- a new character appearance image obtaining module 240 configured to input a source character appearance image and a target character appearance image into the trained second character appearance fusion model to obtain a new character appearance image.

Additionally, the first character appearance fusion model includes a feature injection module and a first decoder. The third character appearance image obtaining module 220 is further configured to:

- input the facial feature information and the structural feature information into the feature injection module to obtain fused feature information; and
- input the fused feature information into the first decoder to output the third character appearance image.

Additionally, the first character appearance fusion model further includes a first encoder. The first encoder is hop-connected with the first decoder. The third character appearance image obtaining module 220 is further configured to:

- input the second character appearance image into the first encoder to obtain first encoding information;
- input the first encoding information, the facial feature information, and the structural feature information into the feature injection module to obtain fused feature information; and
- input the fused feature information, the first encoding information, and the structural feature information into the first decoder to obtain the third character appearance image.

Additionally, the feature injection module includes a fully-connected layer, a convolutional layer and an injection layer. The third character appearance image obtaining module 220 is further configured to:

- input the facial feature information into the fully-connected layer to obtain intermediate facial feature information;
- input the structural feature information into the convolutional layer to obtain intermediate structural feature information; and
- input the intermediate facial feature information, the intermediate structural feature information, and the first encoding information into the injection layer for fusion, and outputting the fused feature information.

Additionally, the second character appearance fusion model includes a second encoder and a second decoder. The new character appearance image obtaining module 240 is further configured to:

- input the source character appearance image and the target character appearance image into the second encoder to obtain second encoding information; and
- input the second encoding information into the second decoder to obtain the new character appearance image.

Additionally, the apparatus further includes: a first character appearance fusion model training module configured to:

- extract first facial feature sample information of a first character appearance sample and first structural feature sample information of a second character appearance sample;
- input the first facial feature sample information and the first structural feature sample information into the first character appearance fusion model to output a third character appearance sample;
- extract second facial feature sample information and second structural feature sample information of the third character appearance sample;
- determine a first loss function of the second facial feature sample information and the first facial feature sample information, and a second loss function of the second structural feature sample information and the first structural feature sample information; and
- train the first character appearance fusion model based on the first loss function and the second loss function.

Additionally, the second character appearance fusion model training module 230 is further configured to:

- input the first character appearance image and the second character appearance image into the second character appearance fusion model, and obtain a fused character appearance image;
- determine a third loss function of the fused character appearance image and the third character appearance image; and
- train the second character appearance fusion model based on the third loss function.

The apparatus may execute the methods provided in all examples of the disclosure and have corresponding functional modules for executing the methods. For technical details not described in detail in the example, reference may be made to the methods provided in all of the examples of the disclosure.

Figure 5:
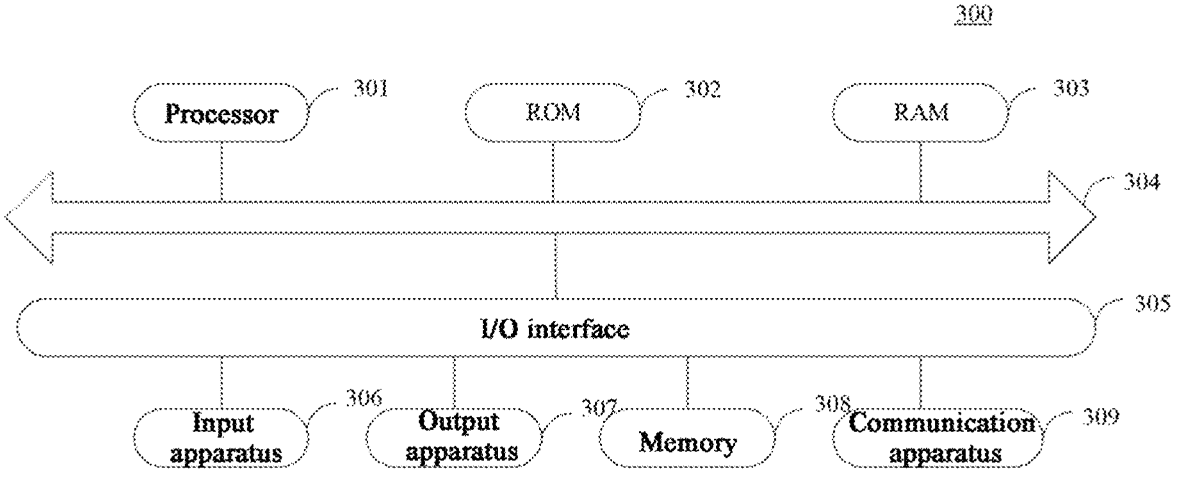
FIG. 5 is a schematic structural diagram of an electronic device according to an example of the disclosure.

With reference to FIG. 5 below, a schematic structural diagram of an electronic device 300 suitable for implementing an example of the disclosure is shown. The electronic device in the example of the disclosure may include, but is not limited to, a mobile terminal such as a mobile phone, a notebook computer, a digital broadcast receiver, a personal digital assistant (PDA), a pad computer (PAD), a portable media player (PMP), an in-vehicle terminal (for example, an in-vehicle navigation terminal), etc., a fixed terminal such as a digital television (TV), a desktop computer, etc., and various forms of servers, such as a standalone server or a server cluster. The electronic device illustrated in FIG. 5 is merely an instance and should not impose any limitation on the functions and scope of use of the examples of the present disclosure.

As shown in FIG. 5, the electronic device 300 may include a processor (for example, a central processing unit, a graphics processing unit, etc.) 301 that may execute various appropriate actions and processes according to programs stored in a read-only memory (ROM) 302 or programs loaded from a storage apparatus 305 into a random-access memory (RAM) 303. The RAM 303 also stores various programs and data needed for the operations of the electronic device 300. The processor 301, the ROM 302, and the RAM 303 are connected to each other by means of a bus 304. An input/output (I/O) interface 305 is also connected to the bus 304.

Typically, the following apparatuses may be connected to the I/O interface 305: an input apparatus 306 including, for example, a touch screen, a touch pad, a keyboard, a mouse, a camera, a microphone, an accelerometer, a gyroscope, etc.; an output apparatus 307 including, for example, a liquid crystal display (LCD), a speaker, a vibrator, etc.; a storage apparatus 308 including, for example, a magnetic tape, a hard disk, etc.; and a communication apparatus 309. The communication apparatus 309 may allow the electronic device 300 to be in wireless or wired communication with other devices to exchange data. While the FIG. 5 illustrates an electronic device 300 having various apparatuses, it should be understood that not all of the illustrated apparatuses are required to be implemented or provided. More or fewer apparatuses may alternatively be implemented or provided.

In particular, according to examples of the disclosure, a processes described above with reference to the flowcharts may be implemented as a computer software program. For example, examples in the disclosure include a computer program product. The computer program product includes a computer program carried on a computer-readable medium, and the computer program includes a program code for executing the method for processing an image in the examples of the disclosure. In such examples, the computer program may be downloaded and installed from a network by means of the communication apparatuses 309, or installed from the storage device 305, or installed from the ROM 302. When executed by the processor 301, the computer program executes the above-described functions defined in the method of the example of the present disclosure.

It should be noted that the computer-readable medium in the disclosure may be a computer-readable signal medium or a computer-readable storage medium, or any combination of a computer-readable signal medium and a computer-readable storage medium. The computer-readable storage medium may include, but is not limited to, an electronic, magnetic, optical, electromagnetic, infrared, or semiconductor system, apparatus, or device, or any combination of the foregoing. More specific instance of the computer-readable storage medium may include, but is not limited to, an electrical connection based on at least one wire, a portable computer diskette, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium that includes or stores a program for use by or in conjunction with an instruction execution system, apparatus, or device. In the present disclosure, the compute-readable signal medium may include a data signal propagating in a baseband or as part of a carry wave and carrying a computer-readable program code. Such a propagated data signal may have a variety of forms and may include, but is not limited to, an electromagnetic signal, an optical signal, or any suitable combination of the foregoing. The computer-readable signal medium may also be any computer-readable medium besides a computer-readable storage medium. The computer-readable signal medium can send, propagate, or transmit a program for use by or in conjunction with an instruction execution system, apparatus, or device. A program code included on a computer-readable medium may be transmitted by means of any suitable medium, including, but not limited to, wires, fiber optic cables, radio frequency (RF), etc., or any suitable combination of the foregoing.

In some embodiments, a client side and a server may communicate by using any currently known or future developed network protocol, such as a hypertext transfer protocol (HTTP), and may be interconnected with any form or medium of digital data communication (for example, a communication network). Instances of communication networks include a local area network (LAN), a wide area network (WAN), Internet work (for example, the Internet), and an end-to-end network (for example, an ad hoc end-to-end network), as well as any currently known or future developed network.

The computer-readable medium may be included in the above electronic device, and may also exist independently without being assembled into the electronic device.

The computer-readable medium carries at least one program. When executed by the electronic device, the at least one program causes the electronic device to: extract facial feature information of a first character appearance image and structural feature information of a second character appearance image; input the facial feature information and the structural feature information into a first character appearance fusion model to obtain a third character appearance image; train a second character appearance fusion model based on the first character appearance image, the second character appearance image and the third character appearance image; and input a source character appearance image and a target character appearance image into the trained second character appearance image fusion model to obtain a new character appearance image.

A computer program code for performing operations of the disclosure may be written in one or more programming languages, or combinations of the programming languages. The programming languages include, but are not limited to, object-oriented programming languages, such as Java, Smalltalk, and C++, and further include conventional procedural programming languages, such as the C programming language or similar programming languages. The program code may be executed entirely on a user computer, partly on a user computer, as a stand-alone software package, partly on a user computer and partly on a remote computer, or entirely on a remote computer or server. In the case involving a remote computer, the remote computer may be connected with a user computer through any kind of network, including a local area network (LAN) or a wide area network (WAN), or may be connected with an external computer (for example, connected through the Internet by using an Internet service provider).

The flowcharts and block diagrams in the accompanying drawings illustrate the architecture, functionality, and operations possibly implemented by the systems, methods, and computer program products according to various examples of the disclosure. In this regard, each block in the flowcharts or block diagrams may represent a module, a program segment, or part of a code, and a module, a program segment, or part of a code includes at least one executable instruction for implementing a specified logical function. It should also be noted that in some alternative implementations, a function noted in a block may occur in a different order than an order noted in the figures. For example, two consecutive blocks may actually be executed substantially in parallel, or in a reverse order sometimes, depending on a function involved. It should also be noted that each block in the block diagrams and/or flowcharts, and combinations of blocks in the block diagrams and/or flowcharts, can be implemented by special purpose hardware-based systems that perform specified functions or operations, or can be implemented by combinations of special purpose hardware and computer instructions.

The units described in the example of the disclosure may be implemented in software or hardware. The name of a unit does not constitute a qualification of the unit itself under certain circumstances.

The functions described above herein may be executed at least partially by at least one hardware logic component, for example, exemplary types of hardware logic components that may be used include a field programmable gate array (FPGA), an application specific integrated circuit (ASIC), an application specific standard part (ASSP), a system on chip (SOC), a complex programmable logic device (CPLD), etc. in a non-restrictive way.

In the context of the disclosure, the machine-readable medium may be a tangible medium that may include or store a program for use by or in conjunction with an instruction execution system, apparatus, or device. The machine-readable medium may be a machine-readable al medium or a machine-readable storage medium. The machine-readable medium may include, but is not limited to, an electronic, magnetic, optical, electromagnetic, infrared, or semiconductor system, apparatus, or device, or any suitable combination of the foregoing. More specific instance of the machine-readable storage medium may include an electrical connection based on at least one wire, a portable computer diskette, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

According to at least one of the examples of the disclosure, a method for processing an image is disclosed in the examples of the disclosure. The method includes:

- extracting facial feature information of a first character appearance image and structural feature information of a second character appearance image;
- inputting the facial feature information and the structural feature information into a first character appearance fusion model to obtain a third character appearance image;
- training a second character appearance fusion model based on the first character appearance image, the second character appearance image and the third character appearance image; and
- inputting a source character appearance image and a target character appearance image into the trained second character appearance fusion model to obtain a new character appearance image.

Additionally, the first character appearance fusion model includes a feature injection module and a first decoder, and inputting the facial feature information and the structural feature information into a first character appearance fusion model to obtain a third character appearance image includes:

- inputting the facial feature information and the structural feature information into the feature injection module, and obtain fused feature information; and
- inputting the fused feature information into the first decoder to output the third character appearance image.

Additionally, the first character appearance fusion model further includes a first encoder, the first encoder is hop-connected with the first decoder; and inputting the facial feature information and the structural feature information into a first character appearance fusion model to obtain a third character appearance image includes:

- inputting the second character appearance image into the first encoder, and obtain first encoding information;
- inputting the first encoding information, the facial feature information, and the structural feature information into the feature injection module to obtain fused feature information; and
- inputting the fused feature information, the first encoding information, and the structural feature information into the first decoder to obtain the third character appearance image.

Additionally, the feature injection module includes a fully-connected layer, a convolutional layer and an injection layer, and the step of inputting the first encoding information, the facial feature information, and the structural feature information into the feature injection module to obtain fused feature information includes:

- inputting the facial feature information into the fully-connected layer to obtain intermediate facial feature information;
- inputting the structural feature information into the convolutional layer to obtain intermediate structural feature information; and
- inputting the intermediate facial feature information, the intermediate structural feature information, and the first encoding information into the injection layer for fusion to output the fused feature information.

Additionally, the second character appearance fusion model includes a second encoder and a second decoder, and inputting a source character appearance image and a target character appearance image into the trained second character appearance fusion model to obtain a new character appearance image includes:

- inputting the source character appearance image and the target character appearance image into the second encoder to obtain second encoding information; and
- inputting the second encoding information into the second decoder to obtain the new character appearance image.

Additionally, a method for training the first character appearance fusion model includes:

- extracting first facial feature sample information of a first character appearance sample and first structural feature sample information of a second character appearance sample;
- inputting the first facial feature sample information and the first structural feature sample information into the first character appearance fusion model to output a third character appearance sample;

extracting second facial feature sample information and second structural feature sample information of the third character appearance sample;

determining a first loss function of the second facial feature sample information and the first facial feature sample information, and a second loss function of the second structural feature sample information and the first structural feature sample information; and training the first character appearance fusion model based on the first loss function and the second loss function.

Additionally, training a second character appearance fusion model based on the first character appearance image, the second character appearance image and the third character appearance image includes:

inputting the first character appearance image and the second character appearance image into the second character appearance fusion model to obtain a fused character appearance image;

determining a third loss function of the fused character appearance image and the third character appearance image; and training the second character appearance fusion model based on the third loss function.

According to at least one of the examples of the disclosure, an apparatus for processing an image is further disclosed in the examples of the disclosure. The apparatus includes:

a feature information extraction module configured to extract facial feature information of a first character appearance image and structural feature information of a second character appearance image;

a third character appearance image obtaining module configured to input the facial feature information and the structural feature information into a first character appearance fusion model to obtain a third character appearance image;

a second character appearance fusion model training module configured to train a second character appearance fusion model based on the first character appearance image, the second character appearance image and the third character appearance image; and a new character appearance image obtaining module configured to input a source character appearance image and a target character appearance image into the trained second character appearance fusion model to obtain a new character appearance image.

According to at least one of the examples of the disclosure, an electronic device is further disclosed in the examples of the disclosure. The electronic device includes:

at least one processor; and a memory configured to store at least one program;

when executed by the at least one processor, the at least one program causes the at least one processor to implement the method for processing an image according to any of examples of the disclosure.

According to at least one of the examples of the disclosure, a computer-readable medium is further disclosed in the examples of the disclosure. The computer-readable medium stores a computer program. The computer program implements the method for processing an image according to any of the examples of the disclosure when executed by a processor.

According to at least one of the examples of the disclosure, a computer program product is further disclosed in the examples of the disclosure. When executed by a computer, the computer program product causes the computer to implement the method for processing an image according to any of the examples of the disclosure.

We claim:

1. A method for processing an image, comprising:

extracting facial feature information of a first character appearance image and structural feature information of a second character appearance image;

inputting the facial feature information and the structural feature information into a first character appearance fusion model to obtain a third character appearance image;

training a second character appearance fusion model based on the first character appearance image, the second character appearance image and the third character appearance image; and inputting a source character appearance image and a target character appearance image into the trained second character appearance fusion model to obtain a new character appearance image.

2. The method of claim 1, wherein the first character appearance fusion model includes a feature injection module and a first decoder, and inputting the facial feature information and the structural feature information into a first character appearance fusion model to obtain a third character appearance image comprises:

inputting the facial feature information and the structural feature information into the feature injection module to obtain fused feature information; and inputting the fused feature information into the first decoder to output the third character appearance image.

3. The method of claim 2, wherein the first character appearance fusion model further includes a first encoder, the first encoder is hop-connected with the first decoder; and inputting the facial feature information and the structural feature information into a first character appearance fusion model to obtaining a third character appearance image comprises:

inputting the second character appearance image into the first encoder to obtain first encoding information;

inputting the first encoding information, the facial feature information, and the structural feature information into the feature injection module to obtain fused feature information; and inputting the fused feature information, the first encoding information, and the structural feature information into the first decoder to obtain the third character appearance image.

4. The method of claim 3, wherein the feature injection module comprises a fully-connected layer, a convolutional layer and an injection layer; and inputting the first encoding information, the facial feature information, and the structural feature information into the feature injection module to obtain fused feature information comprises:

inputting the facial feature information into the fully-connected layer to obtain intermediate facial feature information;

inputting the structural feature information into the convolutional layer to obtain intermediate structural feature information; and inputting the intermediate facial feature information, the intermediate structural feature information, and the first encoding information into the injection layer for fusion to output the fused feature information.

5. The method of claim 1, wherein the second character appearance fusion model comprises a second encoder and a second decoder; and inputting a source character appearance image and a target character appearance image into the trained second character appearance fusion model to obtain a new character appearance image comprises:

inputting the source character appearance image and the target character appearance image into the second encoder to obtain second encoding information; and inputting the second encoding information into the second decoder to obtain the new character appearance image.

6. The method of claim 1, wherein training the first character appearance fusion model comprises:

extracting first facial feature sample information of a first character appearance sample and first structural feature sample information of a second character appearance sample;

inputting the first facial feature sample information and the first structural feature sample information into the first character appearance fusion model to output a third character appearance sample;

extracting second facial feature sample information and second structural feature sample information of the third character appearance sample;

determining a first loss function of the second facial feature sample information and the first facial feature sample information, and a second loss function of the second structural feature sample information and the first structural feature sample information; and training the first character appearance fusion model based on the first loss function and the second loss function.

7. The method of claim 1, wherein training a second character appearance fusion model based on the first character appearance image, the second character appearance image, and the third character appearance image comprises:

inputting the first character appearance image and the second character appearance image into the second character appearance fusion model to obtain a fused character appearance image;

determining a third loss function of the fused character appearance image and the third character appearance image; and training the second character appearance fusion model based on the third loss function.

8. The method of claim 1, including a computer program product which, when executed by a computer, causes the computer to implement the method, comprising:

extracting facial feature information of a first character appearance image and structural feature information of a second character appearance image;

inputting the facial feature information and the structural feature information into a first character appearance fusion model to obtain a third character appearance image;

training a second character appearance fusion model based on the first character appearance image, the second character appearance image and the third character appearance image; and inputting a source character appearance image and a target character appearance image into the trained second character appearance fusion model to obtain a new character appearance image.

9. An electronic device, comprising:

at least one processor; and a memory configured to store at least one program which, when executed by the at least one processor, causes the at least one processor to implement the method, comprising:

extracting facial feature information of a first character appearance image and structural feature information of a second character appearance image;

inputting the facial feature information and the structural feature information into a first character appearance fusion model to obtain a third character appearance image;

training a second character appearance fusion model based on the first character appearance image, the second character appearance image and the third character appearance image; and inputting a source character appearance image and a target character appearance image into the trained second character appearance fusion model to obtain a new character appearance image.

10. The electronic device of claim 9, wherein the first character appearance fusion model includes a feature injection module and a first decoder, and inputting the facial feature information and the structural feature information into a first character appearance fusion model to obtain a third character appearance image comprises:

inputting the facial feature information and the structural feature information into the feature injection module to obtain fused feature information; and inputting the fused feature information into the first decoder to output the third character appearance image.

11. The electronic device of claim 10, wherein the first character appearance fusion model further includes a first encoder, the first encoder is hop-connected with the first decoder; and inputting the facial feature information and the structural feature information into a first character appearance fusion model to obtaining a third character appearance image comprises:

inputting the second character appearance image into the first encoder to obtain first encoding information;

inputting the first encoding information, the facial feature information, and the structural feature information into the feature injection module to obtain fused feature information; and inputting the fused feature information, the first encoding information, and the structural feature information into the first decoder to obtain the third character appearance image.

12. The electronic device of claim 11, wherein the feature injection module comprises a fully-connected layer, a convolutional layer and an injection layer; and inputting the first encoding information, the facial feature information, and the structural feature information into the feature injection module to obtain fused feature information comprises:

inputting the facial feature information into the fully-connected layer to obtain intermediate facial feature information;

inputting the structural feature information into the convolutional layer to obtain intermediate structural feature information; and inputting the intermediate facial feature information, the intermediate structural feature information, and the first encoding information into the injection layer for fusion to output the fused feature information.

13. The electronic device of claim 9, wherein the second character appearance fusion model comprises a second encoder and a second decoder; and inputting a source character appearance image and a target character appearance image into the trained second character appearance fusion model to obtain a new character appearance image comprises:

inputting the source character appearance image and the target character appearance image into the second encoder to obtain second encoding information; and inputting the second encoding information into the second decoder to obtain the new character appearance image.

14. The electronic device of claim 9, wherein training the first character appearance fusion model comprises:

extracting first facial feature sample information of a first character appearance sample and first structural feature sample information of a second character appearance sample;

inputting the first facial feature sample information and the first structural feature sample information into the first character appearance fusion model to output a third character appearance sample;

extracting second facial feature sample information and second structural feature sample information of the third character appearance sample;

determining a first loss function of the second facial feature sample information and the first facial feature sample information, and a second loss function of the second structural feature sample information and the first structural feature sample information; and training the first character appearance fusion model based on the first loss function and the second loss function.

15. The electronic device of claim 14, wherein training a second character appearance fusion model based on the first character appearance image, the second character appearance image, and the third character appearance image comprises:

inputting the first character appearance image and the second character appearance image into the second character appearance fusion model to obtain a fused character appearance image;

determining a third loss function of the fused character appearance image and the third character appearance image; and training the second character appearance fusion model based on the third loss function.

16. A non-transitory computer-readable storage medium, storing a computer program which, when executed by a processor, causes the processor to implement the method, comprising:

extracting facial feature information of a first character appearance image and structural feature information of a second character appearance image;

inputting the facial feature information and the structural feature information into a first character appearance fusion model to obtain a third character appearance image;

training a second character appearance fusion model based on the first character appearance image, the second character appearance image and the third character appearance image; and inputting a source character appearance image and a target character appearance image into the trained second character appearance fusion model to obtain a new character appearance image.

17. The non-transitory computer-readable storage medium of claim 16, wherein the first character appearance fusion model includes a feature injection module and a first decoder, and inputting the facial feature information and the structural feature information into a first character appearance fusion model to obtain a third character appearance image comprises:

inputting the facial feature information and the structural feature information into the feature injection module to obtain fused feature information; and inputting the fused feature information into the first decoder to output the third character appearance image.

18. The non-transitory computer-readable storage medium of claim 17, wherein the first character appearance fusion model further includes a first encoder, the first encoder is hop-connected with the first decoder; and inputting the facial feature information and the structural feature information into a first character appearance fusion model to obtaining a third character appearance image comprises:

inputting the second character appearance image into the first encoder to obtain first encoding information;

inputting the first encoding information, the facial feature information, and the structural feature information into the feature injection module to obtain fused feature information; and inputting the fused feature information, the first encoding information, and the structural feature information into the first decoder to obtain the third character appearance image.

19. The non-transitory computer-readable storage medium of claim 18, wherein the feature injection module comprises a fully-connected layer, a convolutional layer and an injection layer; and inputting the first encoding information, the facial feature information, and the structural feature information into the feature injection module to obtain fused feature information comprises:

inputting the facial feature information into the fully-connected layer to obtain intermediate facial feature information;

inputting the structural feature information into the convolutional layer to obtain intermediate structural feature information; and inputting the intermediate facial feature information, the intermediate structural feature information, and the first encoding information into the injection layer for fusion to output the fused feature information.

20. The non-transitory computer-readable storage medium of claim 16, wherein the second character appearance fusion model comprises a second encoder and a second decoder; and inputting a source character appearance image and a target character appearance image into the trained second character appearance fusion model to obtain a new character appearance image comprises:

inputting the source character appearance image and the target character appearance image into the second encoder to obtain second encoding information; and inputting the second encoding information into the second decoder to obtain the new character appearance image.

* * * * *